United States Patent [19]

D'Allest et al.

[11] Patent Number: 5,447,972
[45] Date of Patent: Sep. 5, 1995

[54] ACRYLIC LATEX VEHICLES FOR AQUEOUS EMULSION/DISPERSION PAINTS

[75] Inventors: Jean-Francois D'Allest; Yves Decloitre, both of Paris; Philippe Larraillet, Saint-Gratien, all of France

[73] Assignee: Rhone-Poulenc Chimie, Courbevoie Cedex, France

[21] Appl. No.: 98,931

[22] Filed: Jul. 29, 1993

[30] Foreign Application Priority Data

Jul. 29, 1992 [FR] France ................. 92 09354

[51] Int. Cl.$^6$ .......................... C08K 3/20; C08L 63/02
[52] U.S. Cl. ..................... 523/409; 523/411; 523/412; 523/413; 525/119
[58] Field of Search ............ 523/403, 409, 411, 412, 523/413; 525/119

[56] References Cited

U.S. PATENT DOCUMENTS

| | | | |
|---|---|---|---|
| 2,954,358 | 9/1960 | Hurwitz . | |
| 3,943,187 | 3/1976 | Wu | 525/119 |
| 4,315,044 | 2/1982 | Elmore et al. | 523/402 |
| 5,061,742 | 10/1991 | Miller | 525/119 |

FOREIGN PATENT DOCUMENTS 2520273 11/1976 Germany .

*Primary Examiner*—Melvyn I. Marquis
*Assistant Examiner*—D. Aylward
*Attorney, Agent, or Firm*—Burns, Doane, Swecker & Mathis

[57] ABSTRACT

Vehicles for one-component aqueous emulsion/dispersion acrylic paints having improved washability and wash-fastness include (a) from 96% to 99.9% by weight, relative to the solids content thereof, of an aqueous dispersion of acrylic latex, and (b) from 0.1% to 4% by weight, also relative to the solids content thereof, of an aqueous emulsion of an aromatic epoxy resin which comprises a nonionic surface-active agent.

13 Claims, No Drawings

ACRYLIC LATEX VEHICLES FOR AQUEOUS EMULSION/DISPERSION PAINTS

BACKGROUND OF THE INVENTION

1. Field of the Invention

The present invention relates to novel vehicles based on a latex of acrylic type for aqueous emulsion (or dispersion) paints.

2. Description of the Prior Art

Paints of the above type are well known to this art and are widely described in the literature, patent and otherwise.

One of the major problems encountered in this type of paint, which is formulated with a low vehicle content (PVC>critical PVC) (PVC=pigment volume concentration), is their wet abrasion resistance, hereinafter designated WAR. Measurement of the WAR enables determination of the washability or the wash-fastness of paints.

This art is replete with various attempts to improve the WAR. Thus, U.S. Pat. No. 4,169,086 describes the addition of a particular salt of an acyl ester of hydroxymethane phosphonic acid.

EP-A-9,110 describes the addition of a polyglycidyl compound to the paint with a view to improving the WAR.

EP-A-69,326, with the object of improving wet adhesion on an alkyd background, describes the addition of 0.2% to 10% by weight of a glycidyl ether which has an epoxy value of 0.1 to 0.8 in 90% to 99.8% by weight of an aqueous dispersion of a vinyl latex, to a paint having a high vehicle content (PVC<critical PVC).

The glycidyl ether, employed as such and not in aqueous dispersion in the vinyl latex, is the product of reaction of epichlorohydrin with an aliphatic alcohol which itself preferably contains an ethoxy group.

The aqueous dispersion obtained undoubtedly exhibits improved wet adhesion, but it is well known to this art that the introduction of an epoxy resin into the aqueous latex dispersion is difficult and the paint thus obtained exhibits insufficient stability in storage.

SUMMARY OF THE INVENTION

Accordingly, a major object of the present invention is the provision of improved paints based on an aqueous dispersion of a latex of acrylic type which exhibit a greatly enhanced WAR in combination with a very good storage stability.

Briefly, the present invention features vehicles for acrylic paints in aqueous emulsion comprising:
- (a) 96% to 99.9% (calculated on the basis of the weight of the solids content) of an aqueous dispersion of acrylic latex, and
- (b) 0.1% to 4%, preferably 0.5% to 2% (calculated on the basis of the weight of the solids content), of an aqueous emulsion of an aromatic epoxy resin containing a nonionic surface-active agent.

DETAILED DESCRIPTION OF PREFERRED EMBODIMENTS OF THE INVENTION

More particularly according to the present invention, the aromatic epoxy resin is preferably an epoxy resin of the bisphenol type, in particular bisphenol A, an epoxy resin of the novolac type, or admixture thereof.

Epoxy resins of the bisphenol A, 2,2-bis(4'-hydroxyphenyl)propane, type are the product of reaction of bisphenol A with epichlorohydrin. These resins are products available commercially, in particular under the trademarks Epikote (Shell), DER (Dow Chemical), Araldite (Ciba) and ERL (UCC).

Epoxy resins of the novolac type are also available commercially, in particular under the trademarks Epikote (Shell), DEN (Dow Chemical) and EPN (Ciba).

It is advantageous to employ an epoxy resin of epoxy equivalent weight of from 160 to 2,000, preferably from 180 to 300.

These aromatic epoxy resins can be emulsified, generally without difficulties, by means of nonionic surface-active agents. Exemplary nonionic surface-active agents include polyethers such as polyethylene and/or polypropylene oxides or alkylaromatic polyethylene and/or polypropylene glycol ethers. Other surfactants which are suitable are hexitol polyalkylene compounds including sorbitans and mannitans, some of which are marketed under the trademark "Tween" by the Atlas Powder Company. Other suitable surfactants include adducts of polyoxyethylene glycol and of glycidyl polyethers of polyhydric phenols. According to the invention it is advantageous to employ 1% to 20%, preferably 3% to 10%, by weight of surfactant relative to the weight of aromatic epoxy resin, when said resin is emulsified in water.

Exemplary aromatic resins and the surfactants which can be employed are described, in particular, in U.S. Pat. No. 4,073,762.

In one particular embodiment of the invention, all or a fraction of the polyoxyalkylene glycol, in which the straight or branched alkylene moiety has from 2 to 6 carbon atoms, is grafted via a covalent bond onto the aromatic epoxy resin.

The present invention therefore also features vehicles for acrylic paints in aqueous emulsion, comprising:
- (a) 96% to 99.9% (calculated on dry basis) of an aqueous latex dispersion,
- (b) 0.1% to 4%, preferably 0.5% to 2% (calculated on dry basis), of an aqueous dispersion of an epoxy resin which is the product of addition of reactants comprising:
  - (a') a diglycidyl ether of a dihydroxylated phenolic compound,
  - (b') a dihydroxylated phenolic compound,
  - (c') a diglycidyl ether of a polyoxyalkylene glycol.

The compounds (a') and (b') of the epoxy resin may contain other substituents of the alkyl, aryl, sulfonyl and similar type.

The preferred compounds (b') are bisphenol A (2,2-bis(4-hydroxyphenyl)propane) and bis(4-hydroxyphenyl)methane.

The diglycidyl ethers (a') are prepared by reaction of (b') with an epoxide containing a halogen atom, for example as described in U.S. Pat. Nos. 2,582,985, 2,615,007 and 2,633,458.

The aqueous dispersion of epoxy resin is stabilized by the incorporation of a diglycidyl ether of a polyoxyalkylene glycol (c') into the resin.

The compound (c') is prepared by reacting epichlorohydrin with a polyoxyalkylene glycol in a molar ratio permitting preparation of (c').

The preferred polyoxyalkylene glycols are those prepared by reacting ethylene oxide and/or propylene oxide with an aliphatic dialcohol such as glycol and having a molecular weight ranging from 5,000 to 10,000. The aqueous dispersion (b) also generally has a solids content of 30% to 80%, preferably 50% to 70%.

The epoxy resin in aqueous dispersion in (b) preferably has a molecular weight ranging from 500 to 20,000.

This epoxy resin is preferably the product of addition of:

(i) 40 to 90 parts by weight of (a'),
(ii) 3 to 35 parts by weight of (b'), and
(iii) 1 to 25 parts by weight of (c').

In a preferred embodiment of the invention, to improve the stability of the aqueous dispersion (b), this aqueous dispersion may additionally comprise a stabilizing amount of a reactive diluent (d') at a concentration in (b) which preferably ranges from 1% to 25%, preferably 5% to 20% by weight relative to the weight of dry epoxy resin present in (b).

Exemplary reactive diluents include the epoxidized unsaturated hydrocarbons and glycidyl ethers of $C_8$–$C_{17}$ aliphatic alcohols, such as 2-ethylhexanol, dodecanol and eicosanol.

To improve its stability in storage, the paints according to the invention and the polymers constituting the vehicle preferably do not contain any nitrogenous compound and/or functional group such as a primary, secondary or tertiary amine liable, on the one hand, to react with the epoxy groups and/or, on the other hand, to catalyze the reaction between the epoxy groups and the carboxylic groups which may be present in the polymer.

The aqueous dispersions (b) of epoxy resin according to the present invention are described, for example, more particularly in U.S. Pat. No. 4,315,044.

The aqueous dispersion of acrylic latex (a) is any known aqueous dispersion of this type which can be employed in aqueous paint dispersions. An "aqueous paint dispersion" also comprehends dispersions of pasty consistency, such as a mastic, or semifluid, such as a coating.

The constituent monomers of the (co)polymer forming the latex particles are at least based on esters of acrylic or methacrylic acid in which the alkyl moiety has from 1 to 8, preferably from 1 to 4, carbon atoms.

Too, the constituent monomers of the copolymer are selected such that the glass transition temperature Tg of the copolymer ranges from −30° C. to +50° C., preferably from −5° to +30° C. The measurement of the Tg is determined by differential thermal analysis (DSC="Differential Scanning Calorimetry").

The copolymer chain is preferably constituted of a sequencing of "hard" monomers such as styrene and methyl methacrylate, which are used in combination with "soft" monomers, such as ethyl acrylate, propyl acrylate or n-butyl acrylate and 2-ethylhexyl acrylate.

It is known to this art how to determine the nature and the amount of monomers to provide the desired Tg.

Exemplary copolymers which are suitable include:

(i) a styreneethyl acrylate copolymer having a Tg of from 0° C. to +20° C. when the styrene/ethyl acrylate weight ratio ranges from 26/74 to 45/55;
(ii) a styrene/2-ethylhexyl acrylate copolymer having a Tg of from 5° to +30° C. when the styrene/2-ethylhexyl acrylate ratio ranges from 50/50 to 60/40;
(iii) a styrenen-butyl acrylate copolymer having a Tg ranging from −5° to +40° C. with a styrene/n-butyl acrylate ratio ranging from 36/60 to 50/50.

It is advantageous to also include at least one of the following other monomers:

(iv) 0.1% to 5% by weight relative to the total weight of the monomers of dicyclopentadienyl (meth)acrylate or ethylene glycol dimethacrylate,
(v) 0.1% to 5% by weight of an ethylenically unsaturated carboxylic acid, such as acrylic, methacrylic, maleic, fumaric and itaconic acid, as well as the corresponding amides,
(vi) 0.1% to 5% by weight of ethylenically unsaturated sulfonate or sulfate monomer, such as methallylsulfonate.

The aqueous acrylic dispersions (a) are prepared by aqueous emulsion polymerization of said monomer, optionally in admixture with a stabilizing monomer in a stable medium generally a alkaline pH.

Other than such monomers, said polymerization medium includes an aqueous phase and various conventional emulsion polymerization adjuvants (catalysts, emulsifiers, etc.), the latter being selected from those stable in an alkaline medium.

Exemplary such catalysts include organic hydroperoxides such as cumene, diisopropylbenzene and paramentane hydroperoxides, etc., and persulfates such as sodium, potassium or ammonium persulfates.

Exemplary of the emulsifiers are anionic agents such as alkali metal fatty acid salts, alkyl sulfates, alkylarylsulfonates, sulfosuccinates and alkyl phosphates and nonionic agents such as polyethoxylated fatty alcohols, polyethoxylated alkylphenols and polyethoxylated fatty acids.

The aqueous dispersion (a) may have a solids content of 20% to 65% by weight, and preferably of 40% to 55% by weight, with a particle diameter ranging from 0.05 and 2 μm.

The aqueous paint dispersions according to the invention preferably have a pH which generally ranges from 3 to 9 and preferably from 6 to 8. Indeed, excessively acidic or basic pH values could result in a spontaneous crosslinking of the paint and/or of the epoxy resin.

The paint dispersions according to the invention typically comprise the conventional adjuvants, such as dispersing agents, thickeners, stabilizers, antifoams, antifreezes, coalescers, fungicides or pulverulent substances insoluble in the dispersions (a) and (b), which are finely divided and dispersed and which conventionally include pigments and fillers.

The pigments typically incorporated are titanium dioxide (rutile or anatase) and barytes, optionally in combination with zinc oxide, etc. These white pigments may be used in combination with conventional colorant pigments. Particularly exemplary fillers that can be incorporated include calcium carbonate, silica, talc and calcium sulfate.

The amount of pigments to be incorporated is a function of the desired type of paint. The amount of pigment typically ranges from 10% to 90% relative to the weight of pulverulent material, depending on whether it is intended to formulate a matt paint or a gloss paint.

The vehicle is then incorporated into the pigment fraction.

It is advantageous that the amounts of the various constituents or components of the paint dispersion according to the invention be such that the pigment volume concentration (PVC) ranges from 15% to 90%, preferably from 60% to 84%.

The PVC is the ratio of the volume of the pulverulent material (i.e., pigments+filler materials) to the volume of the total solids content of the paint (solids content of dispersion A+solids content of dispersion B+dry pulverulent matter+dry adjuvants).

The vehicle according to the invention, as well as the paints formulated therefrom display excellent stability in storage, without appreciable change in viscosity over time, as long as the upper limit of 4% of epoxy resin relative to the acrylic latex is observed and as long as the latex dispersion is well mixed with an aromatic resin emulsion.

Further, the vehicle of the invention considerably improves the washability and the wash-fastness of the paint, if the lower limit of 0.1% of epoxy resin relative to the acrylic latex is observed.

At a content of 0.1% thereof, the beneficial effect of the invention is clearly discernible and becomes considerable beginning at 0.5%. Beyond 4% the improvements in the WAR are not discernible. To the contrary, the stability in storage of the vehicle and/or of the paint deteriorates and the paint also tends to yellow on aging.

In order to further illustrate the present invention and the advantages thereof, the following specific examples are given, it being understood that same are intended only as illustrative and in nowise limitative.

In said examples to follow, as in the above description, all parts and percentages are given by weight, unless otherwise indicated.

EXAMPLE 1

(a) Aqueous dispersions (A)

First, two aqueous dispersions $A_1$ and $A_2$ of an acrylic copolymer were prepared by emulsion radical polymerization from the following starting materials:

(i) for the aqueous dispersion $A_1$:

| | |
|---|---|
| Styrene | 48.7 parts by weight, |
| n-Butyl acrylate | 48.6 parts by weight, |
| Acrylic acid | 4.7 parts by weight, |
| Acrylamide | 0.5 parts by weight, |
| Methallylsulfonate | 0.5 parts by weight, |
| Emulsifier | sodium alkylsulfonate, |
| Catalyst | ammonium persulfate, |
| Diameter of the latex particles | 0.15 μm |
| Tg | 35° C., |
| Solids content (SC) | 50%; |

(ii) for the aqueous dispersion $A_2$:

| | |
|---|---|
| Styrene | 36.7 parts by weight, |
| n-Butyl acrylate | 60.0 parts by weight, |
| Acrylic acid | 3.3 parts by weight, |
| Acrylamide | 0.5 parts by weight, |
| Methallylsulfonate | 0.5 parts by weight, |
| Catalyst | ammonium persulfate, |
| Emulsifier | sodium alkylsulfonate, |
| Diameter of the latex particles | 0.15 μm, |
| Tg | 5° C., |
| Solids content (SC) | 50%. |

(b) Aqueous dispersions (B):

Two different dispersions $B_1$ and $B_2$ were employed, marketed by Hi-Tek Polymers under the trademarks CMD W 60-3515 and Epi-Rez 35201, respectively, which had the following characteristics:

| | SC (%) | EEM (1) | Tg | Viscosity (2) | pH |
|---|---|---|---|---|---|
| $B_1$ | 63 | 250 | 7° C. | 11,000 | 3.7 |
| $B_2$ | 60 | 700 | 32° C. | 11,000 | 8.0 |

(1) EEM: Epoxy equivalent weight based on dry resin.
(2) Viscosity: Brookfield viscosity in mPas at 25° C. - spindle 5 at 10 rev/min.

The epoxy resins of $B_1$ and $B_2$ were the product of addition of bisphenol A diglycidyl ether, of bisphenol A and of diglycidyl ether, of a copolymer of ethylene oxide and of propylene oxide.

preparation of the vehicle:

The vehicles $V_1$ to $V_4$ which had the following compositions were prepared:

$V_0 (A_1) = A_1$ by itself (control),
$V_0 (A_2) = A_2$ by itself (control),
$V_1 = A_1 + B_1$ (97.5% + 2.5%),
$V_2 = A_1 + B_2$ (97.5% + 2.5%),
$V_3 = A_1 + B_1$ (99.0% + 1.0%),
$V_4 = A_1 + B_2$ (99.0% + 1.0%),
$V_5 = A_2 + B_1$ (99.0% + 1.0%).

All of the percentages given are calculated on the basis of the weight of the solids content present in A and B.

(d) Preparation of the paint:

(d₁) starting with $A_1$:

The adjuvants and pulverulent materials reported in Table 1 below were mixed in the paint disperser where the vehicle V was already present:

TABLE 1

| Component | Parts by weight | Manufacturer |
|---|---|---|
| Water | 11.3 | — |
| Tylose MH 6000 XP (2% H₂O) | 19.4 | (Hoechst) |
| Coatex P90 salt of acrylic copolymer in aqueous solution | 0.3 | (Coatex) |
| Proxel GXL | 0.15 | (I.C.I.) |
| Nopco 8034 antifoam | 0.1 | (Henkel-Nopco) |
| TiO₂ (RL 68) | 5.3 | (Thann et Mulhouse) |
| Durcal 5 calcium carbonate (mean particle size <5 μm) | 32 | (Omya) |
| Omyalite 90 calcium carbonate (mean particle size <1 μm) | 21.3 | (Omya) |
| Dowanol DPnB coalescing agent | 2 | (Dow) |
| Vehicle V | 8.6 | (Rhône-Poulenc) |

The ingredients were added and mixed in the order indicated in the Table.

In Table 1 the vehicle V represents $L_0(A_1)$ and $L_1$ to $L_4$, inclusive, from which the paints $P_0(A_1)$ and $P_1$ to $P_4$ were prepared, all exhibiting:

(1) a pigment volume concentration (PVC) of 84%,
(2) a solids content (SC) of 63.4%,
(3) a percentage by weight of vehicle (% V) of 8.6% relative to the total weight of the paint.

(d₂) starting with $A_2$:

The procedure was the same as for $A_1$ except that the paints were prepared without any coalescing agent and had the composition reported in Table 2 below:

TABLE 2

| Component | Parts by weight | Manufacturer |
| --- | --- | --- |
| Water | y | — |
| Tylose MH 6000 (2%/H₂O) | 19.4 | (Hoechst) |
| Coatex P90 | 0.3 | (Coatex) |
| Proxel GXL | 0.15 | (I.C.I.) |
| Clerol LSB 908 | 0.1 | (Henkel-Nopco) |
| TiO₂ (RL 68) | 5.3 | (Thann et Mulhouse) |
| Durcal | 32 | (Omya) |
| Omyalite 90 | 21.3 | (Omya) |
| Vehicle V | x | (Rhône-Poulenc) |

The paints $P_0(A_2)$ and $P_5$ were prepared from vehicles $V_0(A_2)$ and $V_5$ and, in addition, two paints $P_0(A_2)$, $P_0(A_2)$ (80) and $P_5$ (75), $P_5$ (80) of different PVC were prepared by varying x and y according to the following Table 3:

TABLE 3

| Paints | PVC (%) | X | Y | S.C. (%) | % V |
| --- | --- | --- | --- | --- | --- |
| $P_0(A_2)$ (75) | 75 | 15 | 11.9 | 63.4 | 14.2 |
| $P_5$ (75) | 75 | 15 | 11.9 | 63.4 | 14.2 |
| $P_0(A_2)$ (80) | 80 | 11.3 | 12.7 | 63.4 | 11 |
| $P_5$ (80) | 80 | 11.3 | 12.7 | 63.4 | 11 |

(e) Evaluation of the paints:

The following two types of tests were performed on the paints obtained:

(i) Paint stability test: a paint sample contained in a receptacle protected from air was heated to 55° C. for 28 days. The stability (S) of the paint is given by the ratio of the Brookfield viscosities of the paints measured at 50 rev/min at 20° C. after 30 days (VF) to the initial viscosity (VI);

(ii) Wet abrasion resistance (WAR) test. This was performed using an abrasimeter according to DIN standard 53778 and is evaluated as the number of cycles after which the paint was eroded.

The results obtained are reported in Table 4 below:

TABLE 4

| Paint | VI mPa.s | S | WAR (cycles) |
| --- | --- | --- | --- |
| $P_0(A_1)$ | 4200 | 1.15 | 1660 |
| $P_1$ | 4360 | 1.15 | N.A. (1) |
| $P_2$ | 4320 | 1.15 | 4230 |
| $P_3$ | 4600 | 1.1 | N.A. (1) |
| $P_4$ | 4160 | 1.15 | 2240 |
| $P_0(A_2)$ (75) | 3920 | 1.1 | 630 |
| $P_5$ (75) | 4480 | 1.15 | 3200 |
| $P_0(A_2)$ (80) | 4440 | 1.15 | 270 |
| $P_5$ (80) | 4320 | 1.15 | 1300 |

(1): no discernible abrasion.

From Table 4 it will be seen that the paints according to the invention, when compared with control paints not containing any epoxy resin, exhibited a considerably improved WAR without exhibiting any appreciable decrease in stability.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A vehicle for an aqueous emulsion/dispersion acrylic paint, comprising (a) from 96% to 99.9% by weight, relative to the solids content thereof, of an aqueous dispersion of acrylic polymer latex, and (b) from 0.1% to 4% by weight, also relative to the solids content thereof, of an aqueous emulsion of an aromatic epoxy resin which comprises a nonionic surface-active agent.

2. The vehicle as defined by claim 1, said aromatic epoxy resin comprising an epoxy resin of bisphenol type, an epoxy resin of novolac type, or admixture thereof.

3. The vehicle as defined by claim 1, said surface-active agent comprising a polyoxyalkylene glycol in which the straight or branched alkylene moiety has from 2 to 6 carbon atoms, all or a fraction thereof being grafted onto said aromatic epoxy resin.

4. The vehicle as defined by claim 1, said aromatic epoxy resin having an epoxy equivalent weight of from 160 to 2,000.

5. The vehicle as defined by claim 1, said aromatic epoxy resin comprising the product of reaction of (a') a diglycidyl ether of a dihydroxylated phenolic compound, (b') a dihydroxylated phenolic compound, and (c') a diglycidyl ether of a polyoxyalkylene glycol.

6. The vehicle as defined by claim 5, said aromatic epoxy resin comprising the product of reaction among 40 to 90 parts by weight of (a'), 3 to 35 parts by weight of (b'), and 1 to 25 parts by weight of (c').

7. The vehicle as defined by claim 5, said compound (b') comprising bisphenol A or bis(4-hydroxyphenyl)methane.

8. The vehicle as defined by claim 5, said compound (c') comprising the product of reaction of epichlorohydrin with a polyoxyalkylene glycol having a molecular weight ranging from 5,000 to 10,000.

9. The vehicle as defined by claim 1, said aqueous dispersion (b) having a solids content from 30% to 80%.

10. The vehicle as defined by claim 5, said aromatic epoxy resin having a molecular weight ranging from 500 to 20,000.

11. The vehicle as defined by claim 1, said acrylic polymer being devoid of nitrogenous species reactive with epoxy groups and/or catalyzing reaction between epoxy groups and carboxyl groups.

12. The vehicle as defined by claim 1, the (co)-polymer constituting the acrylic latex having a Tg of from −30° to +50° C. and comprising the emulsion radical copolymerizate of styrene with an alkyl(meth)acrylate, in which the alkyl moiety has from 1 to 8 carbon atoms, optionally in the presence of 0.1% to 5% by weight, calculated relative to the total weight of the monomers, of at least one other monomer of dicyclopentadienyl(meth)acrylate, ethylene glycol dimethacrylate, (meth)acrylic acid, (meth)acrylic amide, maleic acid maleic amide, fumaric acid, fumaric amide, itaconic acid, itaconic amide, ethylenically unsaturated sulfate or ethylenically unsaturated sulfonate monomer.

13. An aqueous emulsion/dispersion acrylic paint, comprising the vehicle as defined by claim 1.

* * * * *